(12) United States Patent
Ueda et al.

(10) Patent No.: US 11,243,136 B2
(45) Date of Patent: Feb. 8, 2022

(54) ROTATING BODY LOAD MEASURING DEVICE

(71) Applicants: MITSUBISHI HEAVY INDUSTRIES MACHINERY SYSTEMS, LTD., Hyogo (JP); BRIDGESTONE CORPORATION, Tokyo (JP)

(72) Inventors: Tatsuya Ueda, Hiroshima (JP); Jiro Agawa, Hiroshima (JP); Takumi Tsumura, Hiroshima (JP); Makoto Tachibana, Hiroshima (JP)

(73) Assignees: MITSUBISHI HEAVY INDUSTRIES MACHINERY SYSTEMS, LTD., Hyogo (JP); BRIDGESTONE CORPORATION, Tokyo (JP)

( * ) Notice: Subject to any disclaimer, the term of this patent is extended or adjusted under 35 U.S.C. 154(b) by 176 days.

(21) Appl. No.: 16/486,844

(22) PCT Filed: Feb. 22, 2017

(86) PCT No.: PCT/JP2017/006555
§ 371 (c)(1),
(2) Date: Aug. 19, 2019

(87) PCT Pub. No.: WO2018/154649
PCT Pub. Date: Aug. 30, 2018

(65) Prior Publication Data
US 2020/0232868 A1 Jul. 23, 2020

(51) Int. Cl.
*G01M 1/16* (2006.01)
*B60C 25/00* (2006.01)
*B60C 25/05* (2006.01)

(52) U.S. Cl.
CPC .............. *G01M 1/16* (2013.01); *B60C 25/007* (2013.01); *B60C 25/0551* (2013.01)

(58) Field of Classification Search
CPC ..... G01M 1/16; B60C 25/007; B60C 25/0551
See application file for complete search history.

(56) References Cited

U.S. PATENT DOCUMENTS

| 4,078,339 A | 3/1978 | Ongaro |
| 4,956,995 A * | 9/1990 | Harrold ............... G01M 17/024 451/28 |

(Continued)

FOREIGN PATENT DOCUMENTS

| CN | 103245516 A | 8/2013 |
| CN | 103323267 A | 9/2013 |

(Continued)

OTHER PUBLICATIONS

International Search Report and Written Opinion for International Application No. PCT/JP2017/006555 dated May 30, 2017; 10pp.

*Primary Examiner* — Alexander Satanovsky
*Assistant Examiner* — Lyudmila Zaykova-Feldman
(74) *Attorney, Agent, or Firm* — Kanesaka Berner and Partners LLP

(57) ABSTRACT

A rotating body load measuring device (100) according to the present invention detects a force acting on a rotating body (30) that is formed in a columnar shape and rotates around a central axis (L60) of a shaft body (60) protruding from a center of an end face, in a state where a main load is applied to the rotating body (30) in a main load direction (P) that is one direction in a radial direction, and includes a load cell (70) having a measurement center (C70) and capable of measuring forces acting in at least three directions with the measurement center (C70) as a reference, in which the load cell (70) is disposed such that the measurement center (C70) and the central axis (L60) overlap when viewed in the main load direction (P), and is connected to the shaft body (60).

7 Claims, 9 Drawing Sheets

(56) References Cited

U.S. PATENT DOCUMENTS

| | | | |
|---|---|---|---|
| 5,067,348 A | 11/1991 | Himmler et al. | |
| 5,309,377 A | 5/1994 | Beebe | |
| 5,398,545 A * | 3/1995 | Blazic | G01L 25/00 73/146 |
| 6,016,695 A * | 1/2000 | Reynolds | G01M 17/022 702/105 |
| 6,834,559 B1 | 12/2004 | Beebe | |
| 2010/0064789 A1 | 3/2010 | Schraudolf et al. | |
| 2012/0297858 A1 | 11/2012 | Sumimoto et al. | |
| 2013/0205883 A1 | 8/2013 | Symens et al. | |
| 2013/0247657 A1 | 9/2013 | Sumitani et al. | |
| 2013/0253852 A1 | 9/2013 | Okada et al. | |
| 2013/0262014 A1 | 10/2013 | Okada et al. | |
| 2014/0230534 A1 * | 8/2014 | Tachibana | G01M 17/027 73/146 |
| 2015/0185113 A1 * | 7/2015 | Tachibana | G01M 17/022 73/146 |
| 2016/0252432 A1 | 9/2016 | Ito et al. | |
| 2017/0153163 A1 | 6/2017 | Okada | |
| 2017/0176295 A1 | 6/2017 | Fukuda | |
| 2018/0045610 A1 * | 2/2018 | Okabe | G01M 17/022 73/865.8 |

FOREIGN PATENT DOCUMENTS

| | | |
|---|---|---|
| CN | 204788986 U | 11/2015 |
| CN | 205002973 U | 1/2016 |
| CN | 105928718 A | 9/2016 |
| JP | S61231431 A | 10/1986 |
| JP | 06003408 | 1/1994 |
| JP | 6003408 B | 1/1994 |
| JP | H0618352 A | 1/1994 |
| JP | H071 98549 A | 8/1995 |
| JP | 2890311 B | 5/1999 |
| JP | 3154015 B | 4/2001 |
| JP | 2001124666 A | 5/2001 |
| JP | 2004045138 A | 2/2004 |
| JP | 2006105773 A | 4/2006 |
| JP | 2008058082 A | 3/2008 |
| JP | 2011158295 A | 8/2011 |
| JP | 5225367 B2 | 7/2013 |
| JP | 5225370 B2 | 7/2013 |
| JP | 2013164417 A | 8/2013 |
| JP | 2013195390 A | 9/2013 |
| JP | 5450475 B | 3/2014 |
| JP | 2015232545 A | 12/2015 |
| JP | 2016075503 A | 5/2016 |
| TW | 201033598 A | 9/2010 |
| WO | 2010041634 A1 | 4/2010 |
| WO | 2014051613 A1 | 4/2014 |
| WO | 2015174323 A1 | 11/2015 |
| WO | 2016024491 A1 | 2/2016 |
| WO | 2016089983 A1 | 6/2016 |

* cited by examiner

ROTATING BODY LOAD MEASURING DEVICE

RELATED APPLICATIONS

The present application is a National Phase of International Application Number PCT/JP2017/006555 filed Feb. 22, 2017.

TECHNICAL FIELD

The present invention relates to a rotating body load measuring device for detecting a force acting on a columnar rotating body in a state where a main load is applied to the rotating body in a radial direction.

BACKGROUND ART

In tires manufactured through a vulcanization process or the like, a tire which satisfies a quality standard such as non-uniformity after the inspection of whether or not to satisfy the quality standard is shipped as a product. As a device for evaluating the non-uniformity of a tire, there is a tire uniformity machine. The tire uniformity machine is provided with a rotary shaft on which a tire is mounted, a load wheel in which a peripheral surface thereof is pressed against a tread of the tire mounted on the rotary shaft, a motor which rotates the load wheel or the tire, and a load cell which measures a load acting on the load wheel or the tire. Then, the non-uniformity of the tire can be evaluated by rotating the load wheel or the tire with the motor in a state where the load wheel is pressed against the tire, and measuring a load with the load cell. In the past, in the tire uniformity machine, as measurement items for evaluating mainly non-uniformity, a radial force variation (hereinafter referred to as RFV) which is a variation in a load in a radial direction of a tire, and a lateral force variation (hereinafter referred to as LFV) which is a variation in a load in a width direction of a tire have been measured. Then, by measuring the RFV, the LFV, or the like, it is possible to evaluate the non-uniformity of the tire.

In recent years, a tractive force variation (hereinafter referred to as TFV) or rolling resistance has been emphasized as the evaluation of a tire, and these cannot be evaluated merely by measuring the variation in a force in the radial direction or the width direction of the tire and are obtained by measuring a force acting in a tangential direction of the tire. For this reason, usually, in particular, the rolling resistance of the tire has been measured by a different measurement method in a rolling resistance measuring device different from the tire uniformity machine. However, in the rolling resistance measuring device, since it takes time from the measurement method, it is not possible to perform total inspection. For this reason, a technique has been proposed which enables prediction evaluation of the rolling resistance or evaluation of the TFV by providing another load cell in order to measure a force in the tangential direction of the tire or providing a function of measuring a force in the tangential direction of the tire in the tire uniformity machine (refer to PTLs 1 and 2, for example).

In the tire uniformity machine described in PTL 1, in a state where a load drum simulating a traveling road surface is brought into compressive contact with a tire, an applied load which is applied to the tire is measured by a load measuring sensor, and the position of the load drum along a load direction is measured by a displacement sensor. Then, the applied load acting on the tire is varied by alternately moving the load drum in a front-back direction, a phase difference between a variation in the position of the load drum and a variation in the applied load is calculated, and a tire having abnormality in rolling resistance is sorted out based on the phase difference.

Further, in the tire uniformity machine described in PTL 2, the tire uniformity machine is provided with a load cell connected to a main shaft which rotates a tire, by a pin, and capable of detecting runout in a tangential direction of the tire, and a load cell capable of detecting runout in a width direction of the tire on the same main shaft. Then, a force obtained by combining a variation force due to a centrifugal force of the tire and a variation force in the tangential direction of the tire is detected by rotating the tire in a state where the load drum is pressed against the tire, and measuring a load with the two load cells. Next, the variation force due to the centrifugal force of the tire is detected by performing the same measurement in a state where the load drum is separated from the tire. Then, by comparing and calculating these detection results in a comparison and calculation device, it is possible to measure the variation force in the tangential direction of the tire.

CITATION LIST

Patent Literature

[PTL 1] Japanese Unexamined Patent Application Publication No. 2015-232545
[PTL 2] Japanese Patent No. 3154015

SUMMARY OF INVENTION

Technical Problem

However, in the tire uniformity machine described in PTL 1, measurement is performed while controlling the alternate movement of the load drum, which is a rotating body to be subjected to load measurement, in the front-back direction in which a main load acts with the load drum being brought into compressive contact with a tread surface, and the rolling resistance which is a resistance value in the tangential direction of the tire is indirectly evaluated based on the phase difference which is calculated from the variation in the position in the radial direction of the load drum and the variation in the applied load. For this reason, there is a problem in that a force in the true tangential direction is not measured and a load drum control error or a calculation error is included, and thus the rolling resistance cannot be accurately evaluated.

Further, in the tire uniformity machine described in PTL 2, it is necessary to provide two load cells; the load cell for detecting runout in the width direction of the tire which is a rotating body to be subjected to load measurement and the load cell capable of detecting runout in the tangential direction of the tire. Further, in order to measure the RFV which is a measurement item required as a tire uniformity machine, it is necessary to further provide a load cell for detecting runout in a direction in which the load drum is pressed against the tire and the main load is generated, and therefore, three load cells are required, and thus there is a problem in that the device becomes complicated and is increased in size, and in addition, a correction of each load cell becomes complicated.

Therefore, the present invention provides a rotating body load measuring device in which it is possible to accurately measure loads acting in a main load direction which is one direction in a radial direction of a rotating body, and in which the main load acts, a central axis direction, and a tangential direction orthogonal to the main load direction and the central axis direction, with a compact device configuration.

Solution to Problem

According to a first aspect of the present invention, there is provided a rotating body load measuring device for detecting a force acting on a rotating body that is formed in a columnar shape and rotates around a central axis of a shaft body protruding from a center of an end face, in a state where a main load is applied to the rotating body in a main load direction that is one direction in a radial direction, the rotating body load measuring device including: a load cell having a measurement center and capable of measuring forces acting in at least three directions with the measurement center as a reference, in which the load cell is disposed such that the measurement center and the central axis overlap when viewed in the main load direction, and is connected to the shaft body.

In the rotating body load measuring device according to the above aspect, it is possible to measure a load acting on the rotating body by the load cell capable of measuring forces acting in at least three directions. For this reason, forces in three directions; the main load direction which is one direction in the radial direction, the central axis direction, the tangential direction orthogonal to the main load direction and the central axis direction, which act on the rotating body, can be directly measured with one load cell. Here, since a force acting on the rotating body is measured in a state where the main load is applied to the rotating body in the main load direction which is one direction in the radial direction, the force acting in the main load direction, among the forces in the three directions, which act on the load cell from the shaft body, has the largest value. The load cell is disposed such that the measurement center and the central axis overlap when viewed in the main load direction of the, and is connected to the shaft body, and therefore, the force in the main load direction acts on the load cell without generating a moment. For this reason, it is possible to minimize the influence of the moment due to the force in the main load direction on the measured values of the forces in other directions which are relatively small values with respect to the force in the main load direction, that is, the measured values of the force in the central axis direction and the force acting in the tangential direction, and thus it is possible to accurately measure the forces in the three directions.

Further, in a rotating body load measuring device according to a second aspect of the present invention, in the first aspect, the load cell may be disposed such that the central axis passes through the measurement center.

In the rotating body load measuring device according to the above aspect, the central axis of the rotating body passes through the measurement center, whereby the forces in directions other than the main load direction, that is, the force in the central axis direction and the force in the tangential direction also act on the measurement center of the load cell without generating the moment. For this reason, it is possible to minimize the mutual influence of the forces acting on the load cell in the three directions by the moments which are generated by the respective forces, and thus it is possible to more accurately measure the forces in the three directions.

Further, according to a third aspect of the present invention, there is provided a rotating body load measuring device for detecting a force acting on a rotating body that is formed in a columnar shape and rotates around a central axis of a shaft body protruding from a center of an end face, in a state where a main load is applied to the rotating body in a main load direction that is one direction in a radial direction, the rotating body load measuring device including: a load cell that is connected to the rotating body, has a load surface on which a load from the rotating body acts, and can measure forces acting on the load surface in at least three directions of an X direction orthogonal to the load surface and a Y direction and a Z direction that are along the load surface and orthogonal to each other, in which the load cell is disposed such that the load surface and the central axis overlap when viewed in the main load direction, and is connected to the shaft body.

In the rotating body load measuring device according to the above aspect, similarly, it is possible to directly measure the forces in the three directions; the main load direction, the central axis direction, and the tangential direction. Further, the load cell is connected to the rotating body, is disposed such that the load surface on which the load from the rotating body acts and the central axis overlap when viewed in the main load direction, and is connected to the shaft body, and therefore, the force in the main load direction acts on the load cell while suppressing generation of a moment. For this reason, it is possible to suppress the influence of a moment due to the force in the main load direction on the measured values of the forces in other directions which are relatively small values with respect to the force in the main load direction, that is, the measured values of the force in the central axis direction and the force acting in the tangential direction, and thus it is possible to accurately measure the forces in the three directions.

Further, in a rotating body load measuring device according to a fourth aspect of the present invention, in the third aspect, the load cell may be disposed such that a centroid of the load surface and the central axis coincide with each other when viewed in the main load direction.

In the rotating body load measuring device according to the above aspect, the load cell is disposed such that the centroid of the load surface and the central axis coincide with each other, and is connected to the shaft body, whereby it is possible to more effectively suppress generation of a moment due to the force in the main load direction. Therefore, it is possible to more effectively suppress the influence on the measured values of the force in the central axis direction and the force acting in the tangential direction, and thus it is possible to more accurately measure the forces in the three directions.

Further, in a rotating body load measuring device according to a fifth aspect of the present invention, in the third or fourth aspect, the load cell may be disposed such that the central axis is included in the load surface.

In the rotating body load measuring device according to the above aspect, the load cell is disposed such that the central axis of the rotating body is included in the load surface, and is connected to the shaft body, whereby even in the forces in directions other than the main load direction, that is, the force in the central axis direction and the force in the tangential direction, generation of a moment can be suppressed. For this reason, it is possible to minimize the mutual influence of the forces acting on the load cell in the three directions by the moments which are generated by the respective forces, and thus it is possible to more accurately measure the forces in the three directions.

Further, in a rotating body load measuring device according to a sixth aspect of the present invention, in any one of the first to fifth aspects, the load cell may have a maximum load measurement direction in which a measurable maximum load is the largest, among the three directions, and be disposed such that the main load direction and the maximum load measurement direction coincide with each other.

In the rotating body load measuring device according to the above aspect, the load cell is disposed such that the main load coincides with the maximum load measurement direction, whereby it is possible to reliably measure the force acting in the main load direction and to measure the force in the central axis direction and the force in the tangential direction with high sensitivity.

Further, in a rotating body load measuring device according to a seventh aspect of the present invention, the rotating body load measuring device according to any one of the first to sixth aspects may further include: a fixing jig which is mounted on the shaft body so as to be rotatable around a mounting shaft orthogonal to the central axis, and to which the load cell is fixed.

In the rotating body load measuring device according to the above aspect, the load cell is connected to the shaft body through the fixing jig so as to be rotatable around the mounting shaft. For this reason, it is possible to suppress a moment around the axis orthogonal to the central axis from generation in the rotating body and the shaft body due to the inclination of the surface to which the load cell is fixed or the dimensional change of the rotating body and the shaft body in the central axis direction and thereby affecting the force in the main load direction and the force in the tangential direction.

Further, in a rotating body load measuring device according to an eighth aspect of the present invention, in any one of the first to seventh aspects, one of the shaft body and the fixing jig may include a pair of first mounting portions disposed with the central axis interposed therebetween, and the other of the shaft body and the fixing jig may include a second mounting portion that is disposed in a plane that includes the central axis, between the pair of first mounting portions, and is mounted to the pair of first mounting portions to be rotatable around the mounting shaft.

In the rotating body load measuring device according to the above aspect, with respect to the pair of first mounting portions, the second mounting portion disposed between the pair of first mounting portions is mounted to be rotatable around the mounting shaft with respect to the pair of first mounting portions, in a plane which includes the central axis, and therefore, it is possible to transmit a force from the shaft body to the load cell while suppressing the generation of a moment without eccentricity due to a structure symmetrical with respect to the central axis.

Further, in a rotating body load measuring device according to a ninth aspect of the present invention, in any one of the first to eighth aspects, the rotating body load measuring device may be a tire uniformity machine which includes a tire that is a test object supported to be rotatable around a tire central axis, a columnar load wheel supported to be rotatable around an axis parallel to the tire central axis, so as to come into contact with a peripheral surface of the tire, and a rotation drive portion that rotationally drives either of the tire or the load wheel, and measures non-uniformity of the tire, based on a force that is measured in the load cell with one of the tire and the load wheel as the rotating body and a load acting from the other of the tire and the load wheel as the main load.

In the rotating body load measuring device according to the above aspect, as the tire uniformity machine, it is possible to accurately measure the force acting in the tangential direction on the contact point between the load wheel and the tire with the load which is transmitted from the load wheel to the tire as the main load, and to accurately evaluate the TFV or the rolling resistance.

Advantageous Effects of Invention

According to the rotating body load measuring device, it is possible to accurately measure loads acting in the main load direction which is one direction in a radial direction of a rotating body, and in which the main load acts, the central axis direction, and the tangential direction orthogonal to the main load direction and the central axis direction, with a compact device configuration.

DESCRIPTION OF EMBODIMENTS

First Embodiment

[Configuration of Tire Uniformity Machine]

Hereinafter, an embodiment of the present invention will be described with reference to FIGS. 1 to 5.

First, the configuration of a rotating body load measuring device according to an embodiment of the present invention will be described. In this embodiment, a tire uniformity machine will be described as an example of the rotating body load measuring device according to the present invention.

(Overall Configuration)

Figure 1:
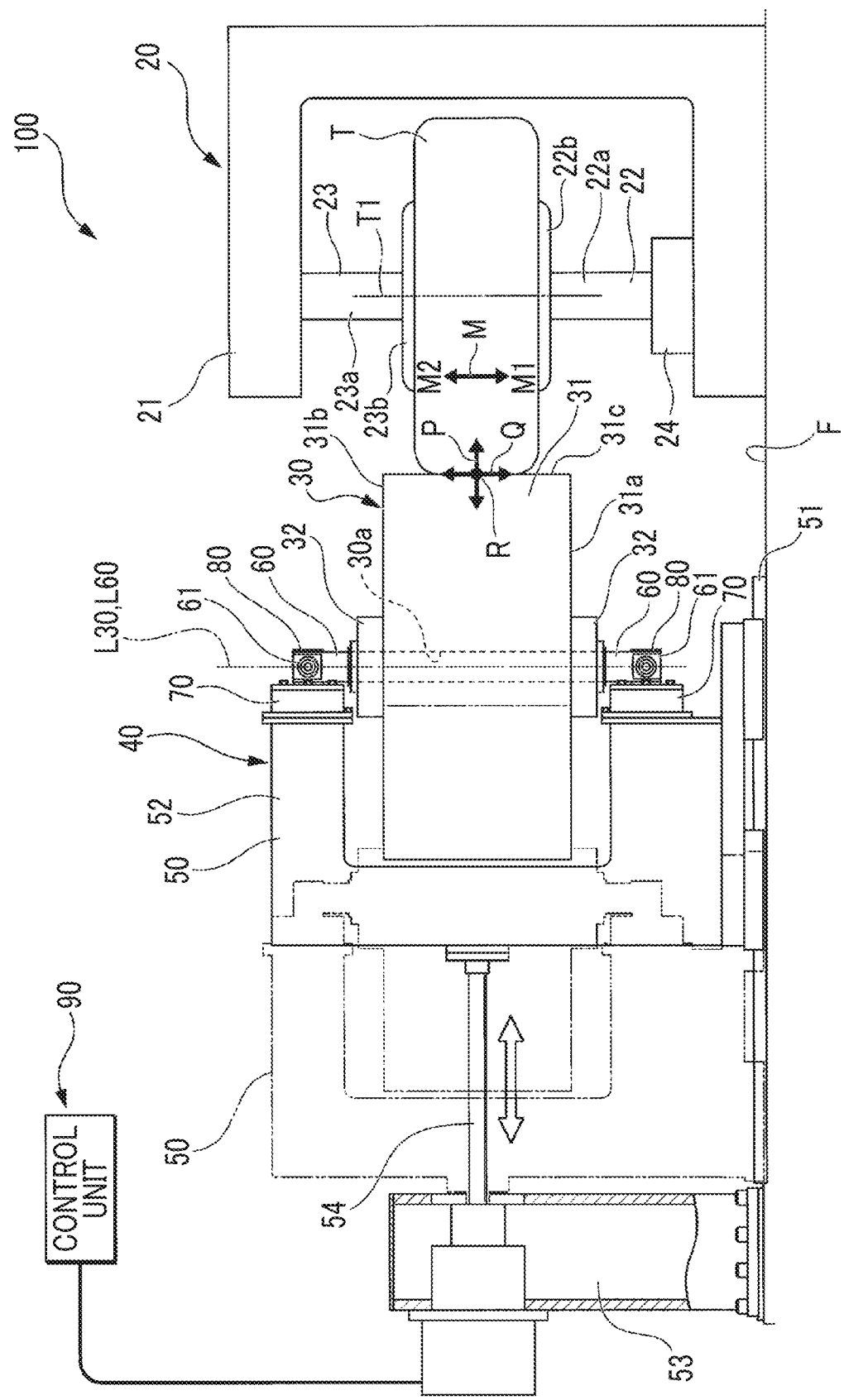
FIG. 1 is a schematic configuration diagram as viewed from the side, showing a tire uniformity machine according to a first embodiment of the present invention.

FIG. 1 shows a tire uniformity machine 100 of a first embodiment and is a device for evaluating the uniformity of a tire T by measuring the generated force while rotationally driving one of the tire T and a load wheel 30 and rotating the other of the tire T and the load wheel 30 in a driven manner, in a state where the tire T and the load wheel 30 are pressed against each other with a desired load, as the rotating body load measuring device. As shown in FIG. 1, the tire uniformity machine 100 of this embodiment is provided with a tire support part 20 which supports the tire T, the load wheel 30 which is a rotating body which is pressed against the tire T supported by the tire support part 20, a load wheel support part 40 which supports the load wheel 30, and a control unit 90.

(Tire Support Part)

The tire support part 20 is provided with a tire-side frame 21, a first support portion 22 disposed on one side M1 in a width direction M of the tire T and supported by the tire-side frame 21, a second support portion 23 disposed on the other side M2 of the tire T and supported by the tire-side frame 21, and a rotation drive portion 24. In the first embodiment, the tire support part 20 supports the tire T such that the width direction M of the tire T is directed in an up-down direction, that is, a central axis T1 of the tire T is directed in the up-down direction, and the first support portion 22 supports the lower side of the tire T, and the second support portion 23 supports the upper side of the tire T. In the following, there is a case where description is made with the width direction M of the tire T as the up-down direction and with one side M1 in the width direction M of the tire T as the lower side and the other side M2 as the upper side.

The first support portion 22 is provided with a first rotary shaft 22a disposed along the width direction M of the tire T and rotatably supported on the tire-side frame 21, and a first rim 22b mounted on the first rotary shaft 22a and supporting a bead on the lower side of the tire T. The second support portion 23 is provided with a second rotary shaft 23a disposed along the width direction M of the tire T and rotatably supported on the tire-side frame 21, and a second rim 23b mounted on the second rotary shaft 23a and supporting a bead on the upper side of the tire T. Further, the rotation drive portion 24 is made so as to be able to rotate the first rotary shaft 22a by a motor (not shown).

That is, the tire T is supported to be clamped from both sides in the up-down direction by the first rim 22b and the second rim 23b of the tire support part 20, and in this state, the first rotary shaft 22a is rotated by the rotation drive portion 24, whereby the tire T can be rotated around the central axis T1 of the tire T. Further, the second rotary shaft 23a of the tire support part 20 is movable from a support position where the second rim 23b supports the tire T to a retreat position where the second rim 23b is separated from the tire T, by a movement mechanism (not shown), and the second rotary shaft 23a moves to the retreat position, whereby it is possible to extract a measured tire T and mount an unmeasured tire T.

(Load Wheel)

The load wheel 30 is provided with a wheel body 31 formed in a columnar shape, and a bearing portion 32 mounted on the wheel body 31. In the wheel body 31 and the bearing portion 32, a through-hole 30a is formed coaxially with a central axis L30 of the wheel body 31. Here, the columnar shape is not limited to a flat columnar shape in which a height dimension is small with respect to the diameter of the load wheel 30, the tire T, or the like, and is a concept including a columnar shape in which the diameter and the height dimension are the same or a columnar shape in which the height dimension is large with respect to the diameter and including even a cylindrical shape in which the inside is hollow. Further, the wheel body 31 is disposed such that the central axis L30 is along the up-down direction, both end faces 31a and 31b face toward the both sides in the up-down direction, and a peripheral surface 31c faces the tire T. Here, a direction in which the load wheel 30 and the tire T face each other, of radial directions of the load wheel 30 and the tire T, is referred to as a main load direction P, and a direction orthogonal to the main load direction P and a central axis direction Q with respective to the load wheel 30 and the tire T, which is the up-down direction, is referred to as a tangential direction R.

(Load Wheel Support Part)

The load wheel support part 40 is provided with a wheel-side frame 50, a shaft body 60 which rotatably supports the load wheel 30, a load cell 70 fixed to the wheel-side frame 50, and a fixing jig 80 which connects the load cell 70 and the shaft body 60. The wheel-side frame 50 is provided with a rail 51 disposed along the main load direction P on a floor surface F, a frame main body 52 movably supported on the rail 51, a base portion 53 fixed to the floor surface F, and an advancing and retreating drive portion 54 which is provided at the base portion 53 and moves the frame main body 52 in the main load direction P. The advancing and retreating drive portion 54 can advance and retreat the wheel-side frame 50 with respect to the tire T along the main load direction P by advancing and retreating a cylinder, a screw, or the like by a driving source such as a hydraulic pressure or an electromagnetic actuator, for example.

(Shaft Body)

Figure 2:
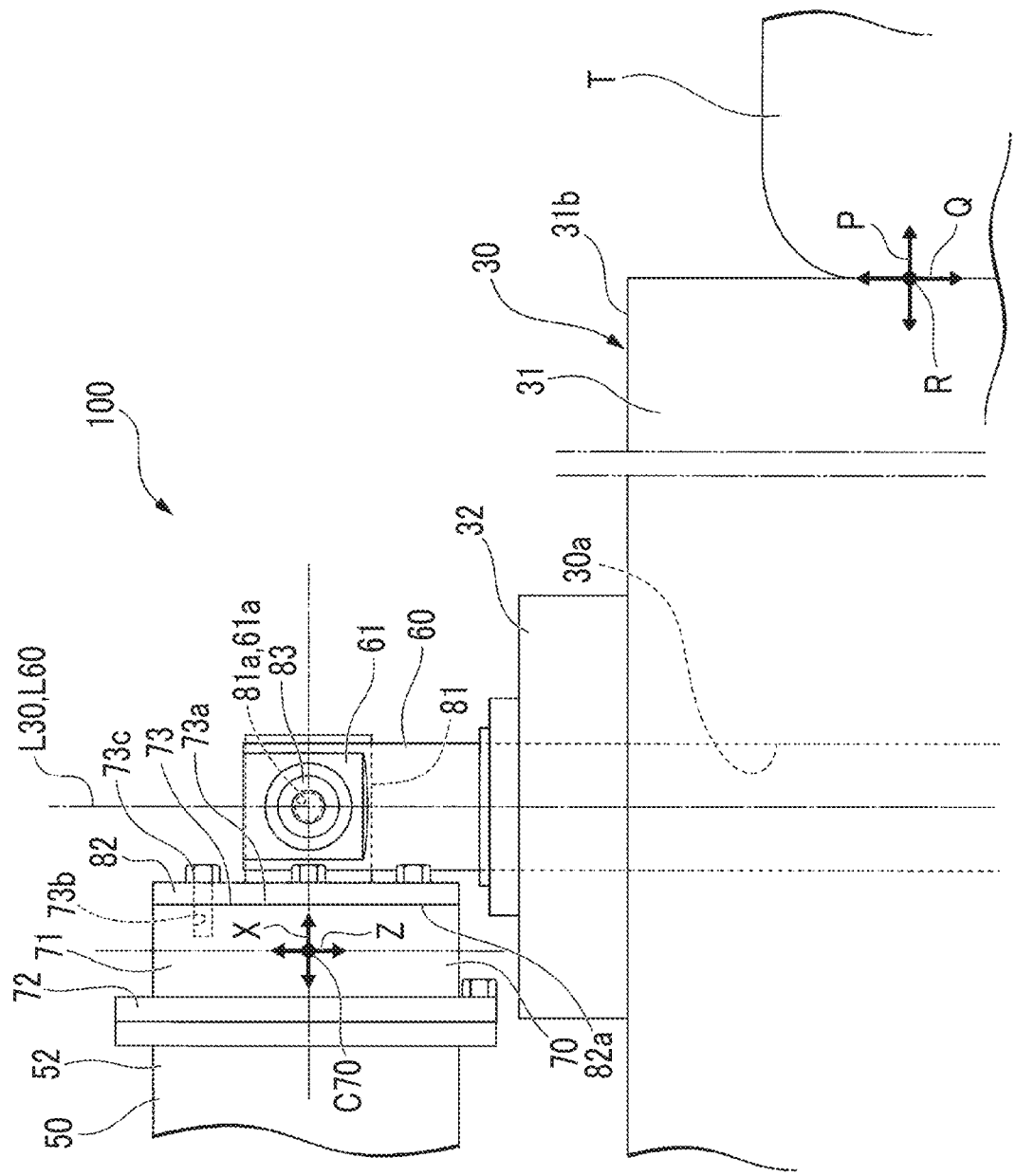
FIG. 2 is a side view showing details of a load cell portion of the tire uniformity machine according to the first embodiment of the present invention.
Figure 3:
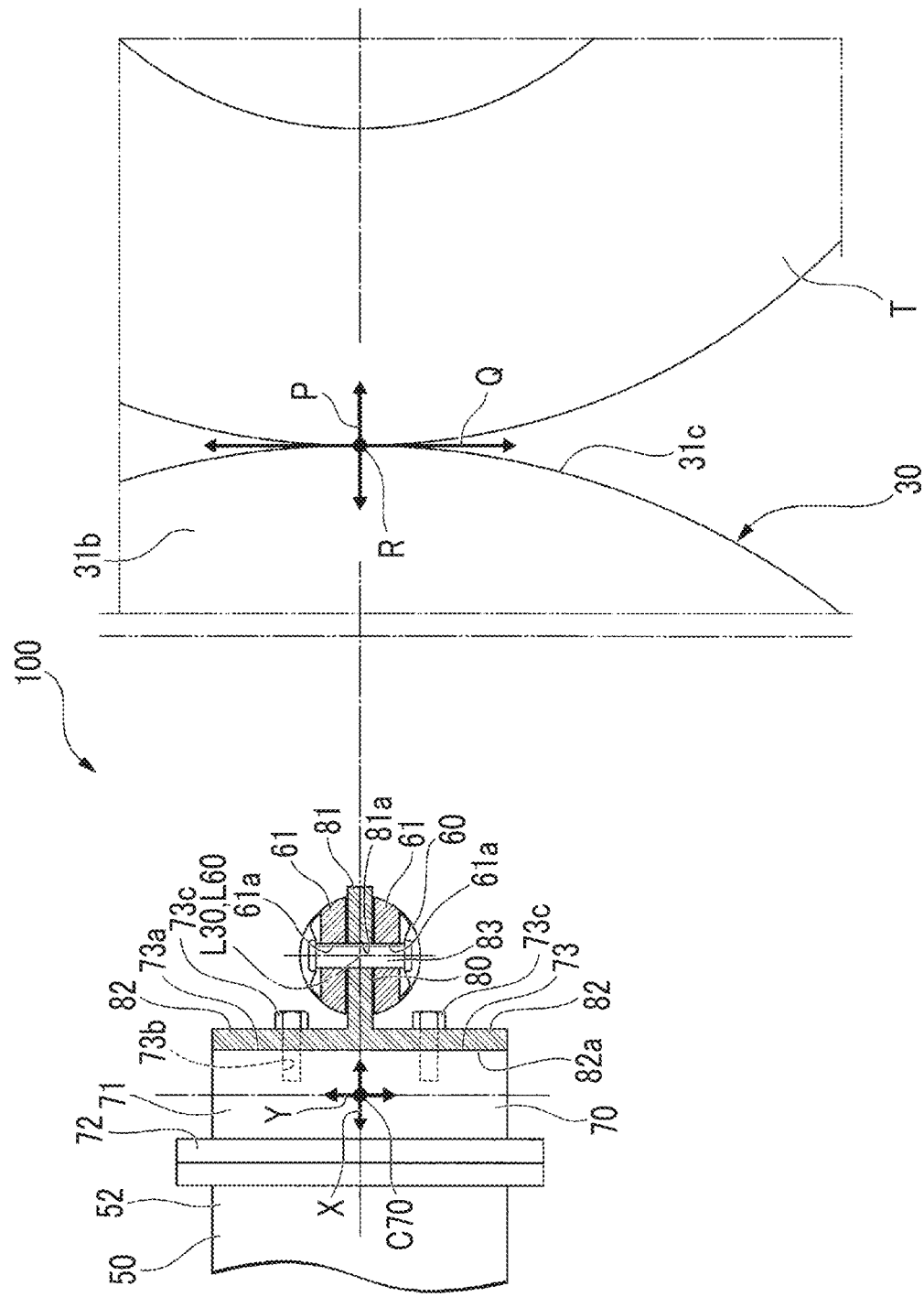
FIG. 3 is a partial sectional view as viewed from above, showing details of the tire uniformity machine according to the first embodiment of the present invention.
Figure 4:
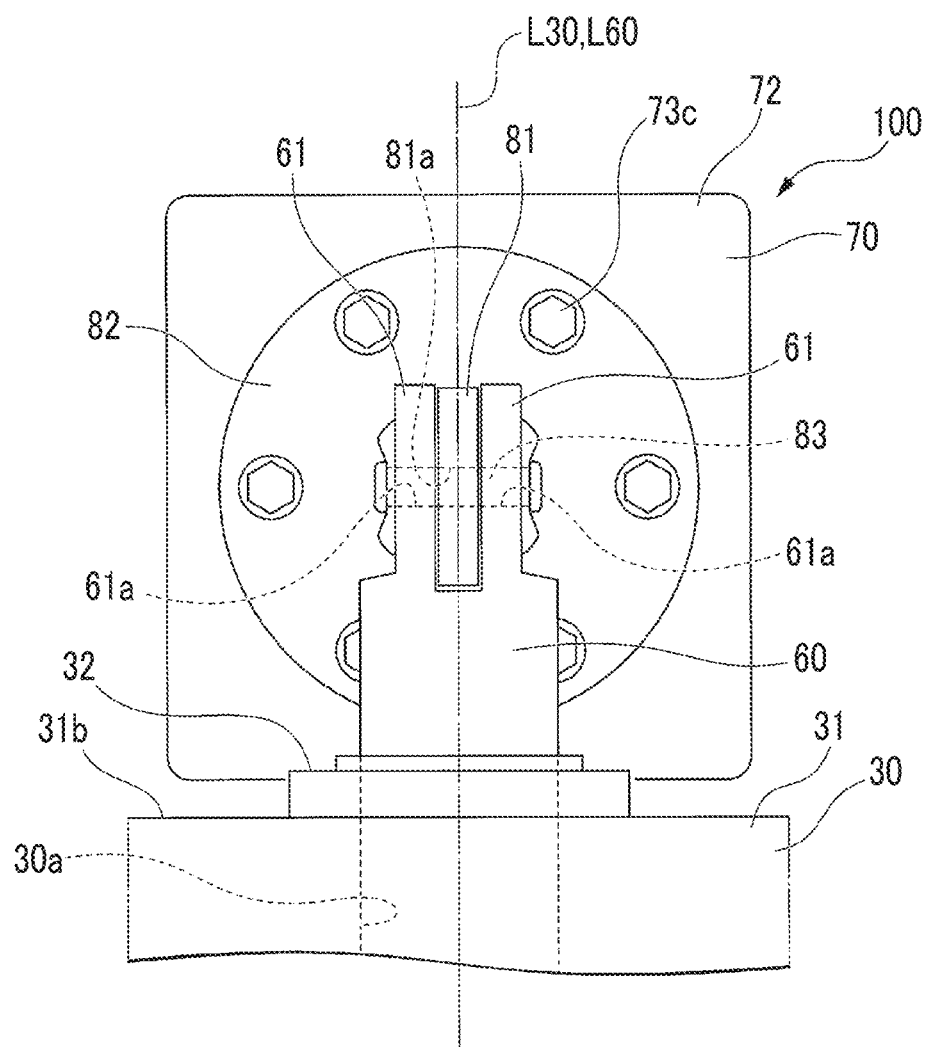
FIG. 4 is a front view as viewed in a main load direction, showing details of the load cell portion in the tire uniformity machine according to the first embodiment of the present invention.

The shaft body 60 is disposed in the through-hole 30a of the load wheel 30 such that a central axis L60 is coaxial with the central axis L30 of the wheel body 31, and is supported so as to be rotatable relative to the bearing portion 32 of the load wheel 30. Further, both ends of the shaft body 60 protrude from the centers of both end faces 31a and 31b of the wheel body 31 toward both sides in the up-down direction. As shown in FIGS. 2 to 4, the shaft body 60 is provided with first mounting portions 61 for mounting the fixing jigs 80 on both upper and lower end portions. The first mounting portions 61 are disposed in a pair and to be spaced apart from each other in the tangential direction R with the central axis L30 of the load wheel 30 interposed therebetween. Further, in the pair of first mounting portions 61, communication holes 61a communicating with each other are formed so as to be coaxial with each other.

(Load Cell)

As shown in FIG. 1, the load cell 70 of this embodiment is connected to each of the upper and lower portions of the shaft body 60. The load cell 70 can measure forces in three directions; an X direction orthogonal to a load surface (described later), and a Y direction and a Z direction orthogonal to the X direction and orthogonal to each other, with a measurement center C70 as a reference. Further, the load cell 70 of this embodiment is configured to set the X direction as a measurement direction in which a measurable maximum load is the largest, thereby being able to measure a force larger than forces acting in the Y direction and the Z direction. As shown in FIGS. 2 to 4, the load cell 70 is provided with a cell main body 71, a first fixing portion 72 fixed to the cell main body 71, and a second fixing portion 73 provided on the side opposite to the first fixing portion 72 in the cell main body 71.

The first fixing portion 72 is provided in a flange shape at the cell main body 71, has a fixing surface, and is fixed to the wheel-side frame 50 by bolts or the like in a state where the fixing surface is in contact with the wheel-side frame 50. Further, the second fixing portion 73 is provided with a planar load surface 73a formed on the outer surface of the cell main body 71, and a plurality of bolt holes 73b which are open on the load surface 73a and have female screws formed therein. Further, the second fixing portion 73 is fixed to the fixing jig 80 by a bolt 73c screwed to each of the bolt holes 73b. The load surface 73a is formed in a substantially circular shape, and the centroid of the load surface 73a and the measurement center C70 substantially coincide with each other when viewed in a maximum load direction.

(Fixing Jig)

The fixing jig 80 is provided with a second mounting portion 81 mounted on the first mounting portion 61 of the shaft body 60, and a cell mounting portion 82 having a cell mounting surface 82a formed corresponding to the load surface 73a in a flange shape fixed to the second mounting portion 81. An insertion hole 82b corresponding to the bolt hole 73b formed in the load surface 73a of the load cell 70 is formed in the cell mounting portion 82. The bolt 73c inserted into the insertion hole 82b is screwed to the bolt hole 73b on the load cell 70 side, whereby the load cell 70 and the fixing jig 80 are fixed to each other with the cell mounting surface 82a and the load surface 73a being brought into contact with each other.

Further, the second mounting portion 81 is formed in a plate shape and is inserted between the pair of first mounting portions 61 of the shaft body 60. Further, a communication hole 81a is formed in the second mounting portion 81 to correspond to the communication holes 61a of the first mounting portions 61. Then, a mounting shaft 83 disposed in the direction orthogonal to the central axes L30 and L60 of the load wheel 30 and the shaft body 60 and orthogonal to the main load direction P penetrates the communication holes 61a of the pair of first mounting portions 61 and the communication hole 81a of the second mounting portion 81, whereby the first mounting portions 61 and the second mounting portion 81 are connected to each other so as to be rotatable relative to each other. In this way, the fixing jig 80 and the load cell 70 fixed to the fixing jig 80 are connected to the shaft body 60 so as to be rotatable around the axis along the tangential direction R orthogonal to the central axis direction Q and the main load direction P.

Further, in such a mounting relationship, the load cell 70 is disposed such that the main load direction P and the maximum load measurement direction coincide with each other by making the load surface 73a parallel to the central axis direction Q and the tangential direction R and be in a direction orthogonal to the main load direction P. Further, the load cell 70 is disposed such that the central axes L30 and L60 of the load wheel 30 and the shaft body 60 are included in the load surface 73a when viewed in the main load direction P and the central axes L30 and L60 coincide with the centroid of the load surface 73a and the measurement center C70.

(Control Unit)

Figure 5:
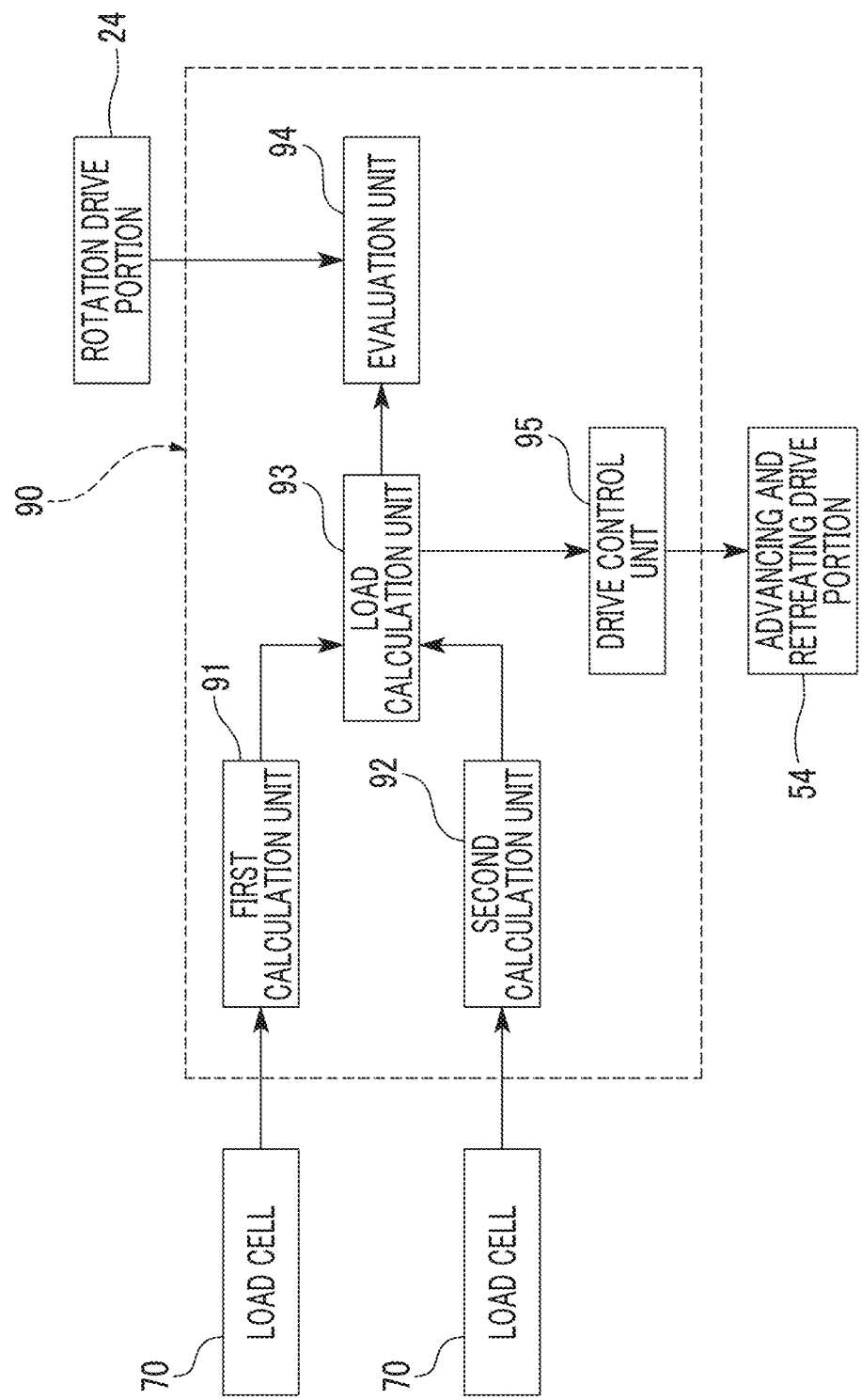
FIG. 5 is a block diagram showing details of a control unit of the tire uniformity machine according to the first embodiment of the present invention.

As shown in FIGS. 1 and 5, the control unit 90 drives the advancing and retreating drive portion 54, based on a load setting value and an actual load detection result by the load cell 70. Specifically, as shown in FIG. 5, the control unit 90 is provided with a first calculation unit 91 which acquires the output value of the upper load cell 70 and calculates a force in the X direction and forces in the Y direction and the Z direction, which act on the load cell 70, a second calculation unit 92 which acquires the output value of the lower load cell 70 and calculates a force in the X direction and forces in the Y direction and the Z direction, which act on the load cell 70, a load calculation unit 93 which calculates a load in the main load direction P, a load in the central axis direction Q, and a load in the tangential direction R, which act on the load wheel 30, based on the calculation results of the first calculation unit 91 and the second calculation unit 92, an evaluation unit 94 which evaluates non-uniformity of the tire T, based on the calculation result by the load calculation unit 93, and a drive control unit 95 which drives the advancing and retreating drive portion 54. The first calculation unit 91 acquires output of an X direction component, output of a Y direction component, and output of a Z direction component from the upper load cell 70. Then, the first calculation unit 91 calculates the force in the X direction from the output of the X direction component, calculates the force in the Y direction from the output of the Y direction component, and calculates the force in the Z direction from the output of the Z direction component. The second calculation unit 92 acquires output of an X direction component, output of a Y direction component, and output of a Z direction component from the lower load cell 70. Then, the second calculation unit 92 calculates the force in the X direction from the output of the X direction component, calculates the force in the Y direction from the output of the Y direction component, and calculates the force in the Z direction from the output of the Z direction component. In a case where the components in the X direction, the Y direction, and the Z direction mutually affect the measured values of the force in the X direction, the force in the Y direction, and the force in the Z direction, when calculating the force in the X direction, a correction may be performed according to the output values of the Y direction component and the Z direction component, when calculating the force in the Y direction, a correction may be performed by the output values of the X direction component and the Z direction component, and when calculating the force in the Z direction, a correction may be performed by the output values of the X direction component and the Y direction component.

The load calculation unit 93 calculates the load in the main load direction P, which acts on the load wheel 30, based on the force in the X direction calculated in the first calculation unit 91 and the force in the X direction calculated in the second calculation unit 92. Specifically, the load calculation unit 93 calculates the load in the main load direction P by the resultant force of the forces in the X direction calculated in the first calculation unit 91 and the second calculation unit 92. Further, the load calculation unit 93 calculates the load in the central axis direction Q, which acts on the load wheel 30, based on the force in the Y direction calculated in the first calculation unit 91 and the force in the Y direction calculated in the second calculation unit 92. Further, the load calculation unit 93 calculates the load in the tangential direction R, which acts on the load wheel 30, based on the force in the Z direction calculated in the first calculation unit 91 and the force in the Z direction calculated in the second calculation unit 92.

The evaluation unit 94 evaluate the non-uniformity, based on the load in the main load direction P, the load in the central axis direction Q, and the load in the tangential direction R calculated in the load calculation unit 93, and phase information of the tire T, which is correspondingly acquired from the rotation drive portion 24. In the evaluation of the non-uniformity of the tire T, it is possible to evaluate RFV based on the load in the main load direction P, LFV based on the load in the central axis direction Q, and TFV based on the load in the tangential direction R, or rolling resistance. The drive control unit 95 adjusts the push-in amount of the load wheel 30 to the tire T which is rotationally driven, by driving the advancing and retreating drive portion 54 while monitoring the load in the main load direction P calculated in the load calculation unit 93, if it receives information about the start of the test. Then, the drive control unit 95 stops the advancement of the load wheel 30 by the advancing and retreating drive portion 54, if the load in the main load direction P reaches a setting value set in advance. In this state, by detecting each load while rotating the tire T, it is possible to evaluate the non-uniformity of the tire T.

[Operational Effects]

The tire uniformity machine 100 of this embodiment measures the load acting on the load wheel 30 which is a rotating body, by the load cell 70 capable of measuring forces acting in at least three directions, in the measurement of the load in the main load direction P, the load in the central axis direction Q, and the load in the tangential direction R. For this reason, the forces in the three directions; the main load direction P, the central axis direction Q, and the tangential direction R orthogonal to the main load direction P and the central axis direction Q, which act on the load wheel 30, can be directly measured with one load cell 70. Here, in a state where a main load is applied from the load wheel 30 to the tire T in the main load direction P which is one direction in the radial direction and the main load is also applied from the tire T to the load wheel 30 due to the reaction force, the force acting on the load wheel 30 is measured. For this reason, among the forces in the three directions, which act on the load cell 70 from the shaft body 60, the force acting in the main load direction P becomes the largest value. The load cell 70 is disposed such that the measurement center C70 and the central axis overlap when viewed in the main load direction P, and is connected to the shaft body 60, and therefore, the force in the main load direction P accurately transmits the force to the load cell 70 without generating a moment. For this reason, it is possible to minimize the influence of the moment by the force in the main load direction P on the measured values of forces in other directions, which are relatively small values with respect to the force in the main load direction P, that is, the force in the central axis direction Q and the force acting in the tangential direction R, and thus it is possible to accurately measure the forces in the three directions.

In this manner, in the tire uniformity machine 100 of this embodiment, the loads acting in the main load direction P which is one direction in the radial direction of the rotating body and on which the main load acts, the central axis direction Q, and the tangential direction R orthogonal to the main load direction P and the central axis direction Q can be accurately measured with a compact device configuration without being provided with a plurality of load cells 70 and by the disposition configuration of the load cell 70. In this way, it is possible to accurately evaluate the RFV, the LFV, the TFV, or the rolling resistance with the load which is transmitted from the load wheel 30 to the tire T as the main load. Further, the rolling resistance evaluation in the tire uniformity machine 100 can be realized, whereby it is possible to easily evaluate the rolling resistance of the tires T in total.

Further, even if the load cell 70 is not disposed such that the measurement center C70 and the central axes L30 and L60 overlap when viewed in the main load direction P, since the load cell 70 is disposed such that the load surface 73*a*, which is fixed to the load wheel 30 and on which the load from the load wheel 30 acts, and the central axes L30 and L60 overlap when viewed in the main load direction P, as described above, the force in the main load direction P acts on the load cell 70 while generation of a moment is suppressed. For this reason, it is possible to suppress the influence of the moment by the force in the main load direction P on the measured values of forces in other directions, which are relatively small values with respect to the force in the main load direction P, that is, the measured values of the force in the central axis direction Q and the force acting in the tangential direction R, and thus it is possible to accurately measure the forces in the three directions. Further, the load cell 70 is disposed such that the central axis passes through the centroid of the load surface 73*a* when viewed in the main load direction P, whereby generation of a moment due to the force in the main load direction P can be more effectively suppressed. Therefore, it is possible to more effectively suppress the influence on the measured values of the force in the central axis direction Q and the force acting on the tangential direction R, and thus it is possible to more accurately measure the forces in the three directions.

Furthermore, in the tire uniformity machine 100 of this embodiment, the load cell 70 is disposed such that the main load direction P coincides with the maximum load measurement direction. For this reason, it is possible to reliably measure the force acting in the main load direction P without exceeding a threshold value and to measure the force in the central axis direction Q and the force in the tangential direction R with high sensitivity.

Further, in the tire uniformity machine 100 of this embodiment, the load cell 70 is connected to the shaft body 60 through the fixing jig 80 so as to be rotatable around the mounting shaft 83. For this reason, it is possible to suppress a moment around the axis orthogonal to the central axes L30 and L60 from generation in the load wheel 30 and the shaft body 60 due to the inclination of the surface to which the load cell 70 is fixed or the dimensional change of the load wheel 30 and the shaft body 60 in the central axis direction Q and thereby affecting the force in the main load direction P and the force in the tangential direction R. Further, as such a structure using the mounting shaft 83, with respect to the pair of first mounting portions 61, the second mounting portion 81 disposed between the pair of first mounting portions 61 is mounted to be rotatable around the mounting shaft 83 with respect to the pair of first mounting portions so as to be disposed in a plane which includes the central axes L30 and L60. For this reason, it is possible to transmit a force from the shaft body 60 to the load cell 70 while suppressing the generation of a moment without eccentricity due to a structure symmetrical with respect to the central axes L30 and L60. In the above, the pair of first mounting portions 61 is provided at the shaft body 60 and the second mounting portion 81 is provided at the fixing jig 80. However, there is no limitation thereto, and even with a configuration in which the second mounting portion 81 is provided at the shaft body 60 and the pair of first mounting portions 61 is provided at the fixing jig 80, the same operational effect can be obtained.

In this embodiment, the load cell 70 is disposed with the load surface 73*a* being in a direction orthogonal to the main load direction P. However, there is no limitation thereto. In particular, in a case where in the load cell 70, a direction other than the X direction, that is, the Y direction or the Z direction is the maximum load measurement direction, it is desirable to dispose the load cell such that the maximum load measurement direction and the main load direction P coincide with each other. Further, the load cell 70 may be connected to the shaft body 60 such that the central axes L30 and L60 pass through the measurement center C70 of the load cell 70. In this way, forces in directions other than the main load direction P, that is, the force in the central axis direction Q and the force in the tangential direction R also act on the measurement center C70 of the load cell 70 without generating a moment. For this reason, it is possible to minimize the mutual influence of the forces acting on the load cell 70 in the three directions due to the moments which are generated by the respective forces, and thus it is possible to more accurately measure the forces in the three directions.

Second Embodiment

Figure 6:
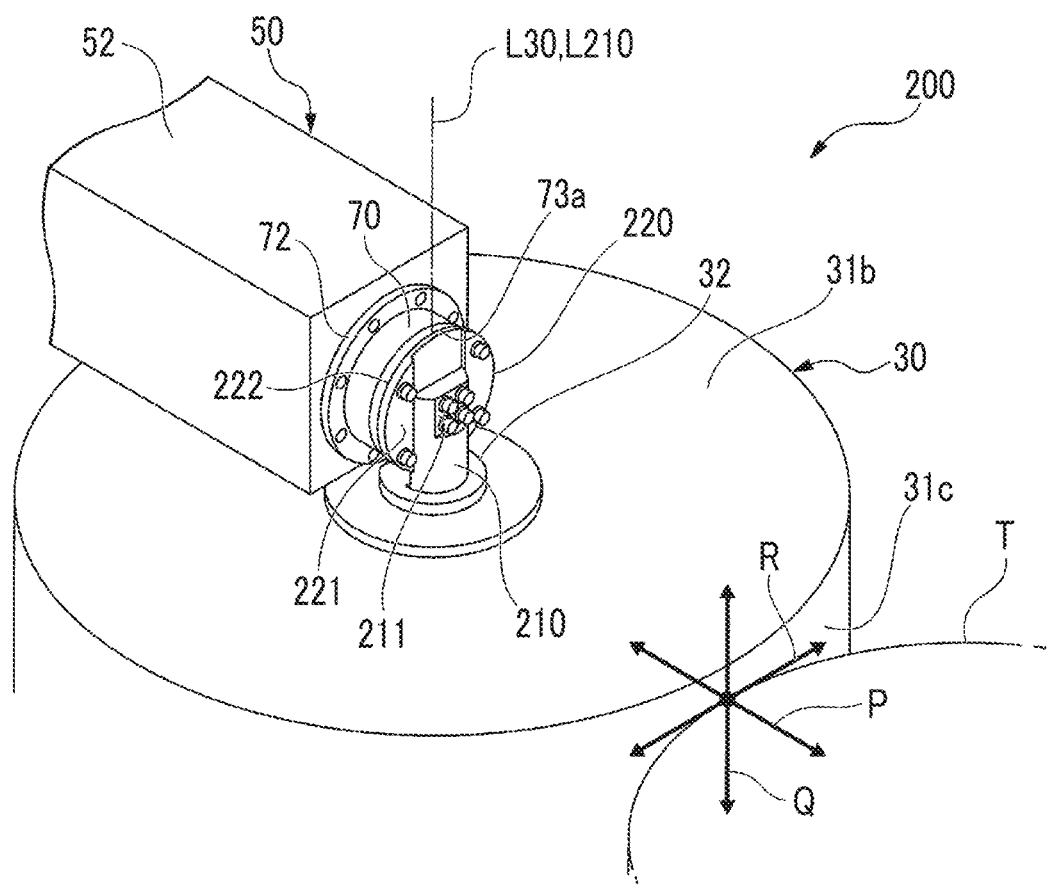
FIG. 6 is a perspective view showing details of a load cell portion in a tire uniformity machine according to a second embodiment of the present invention.
Figure 7:
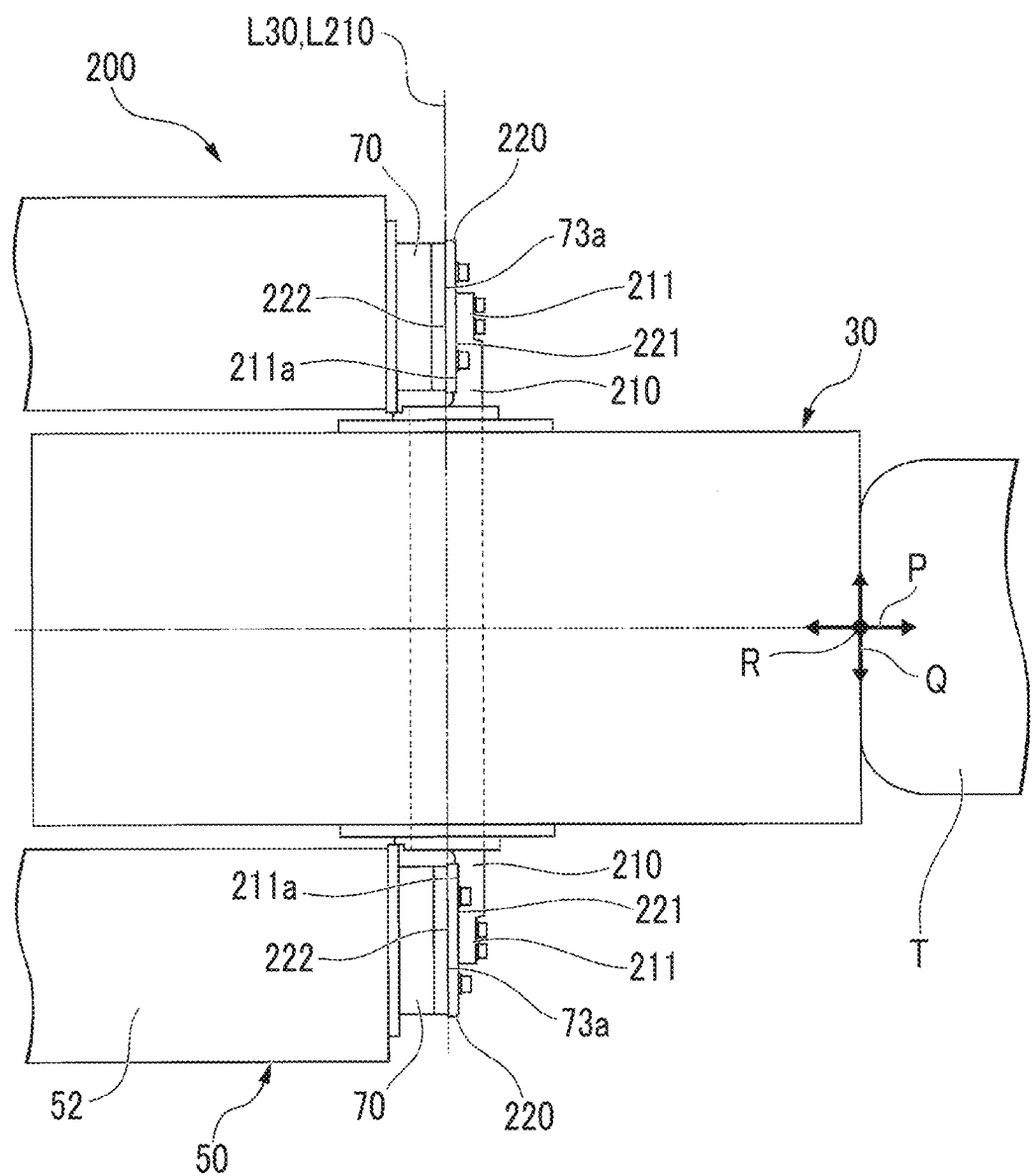
FIG. 7 is a plan view showing details of the load cell portion of the tire uniformity machine according to the second embodiment of the present invention.
Figure 8:
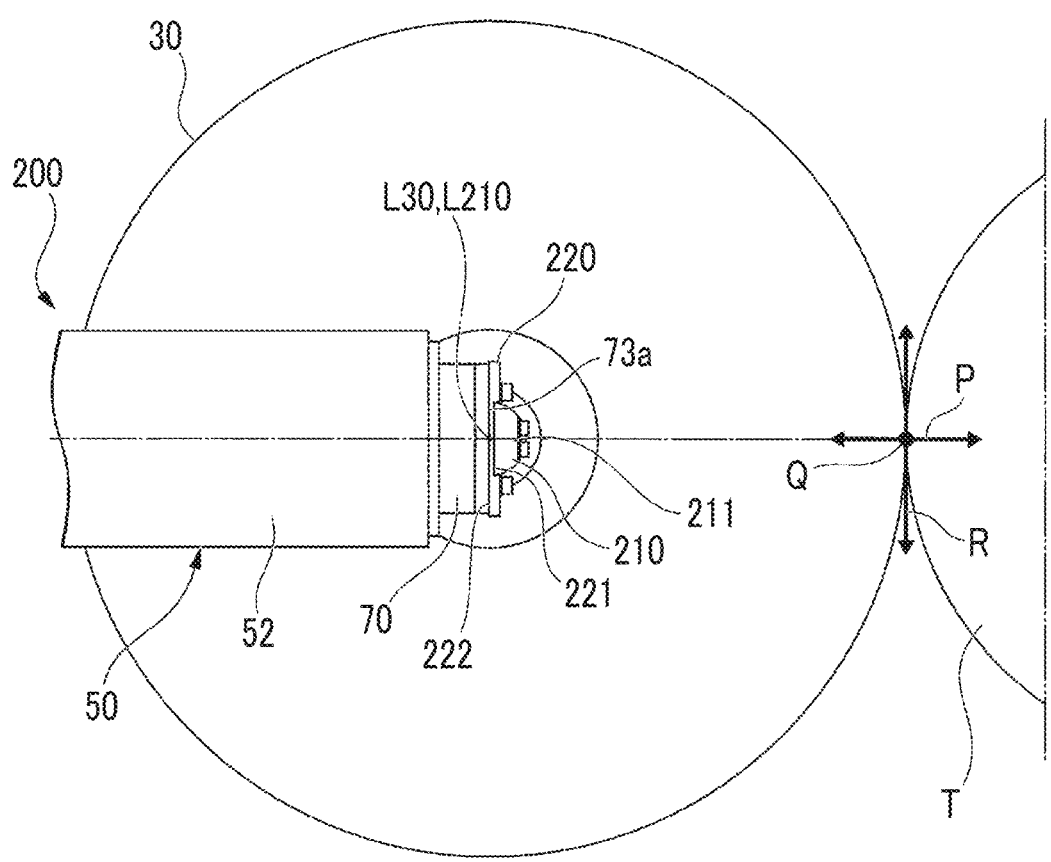
FIG. 8 is a side view showing details of the load cell portion of the tire uniformity machine according to the second embodiment of the present invention.

FIGS. 6 to 8 show a tire uniformity machine 200 of a second embodiment. The tire uniformity machine 200 of this embodiment is different from the tire uniformity machine 100 of the first embodiment in terms of the disposition and mounting structure of the load cell 70. Further, in this embodiment, members common to the members used in the above-described embodiment are denoted by the same reference numerals, and description thereof is omitted.

As shown in FIGS. 6 to 8, in the tire uniformity machine 200 of this embodiment, a fixing jig 220 which connects the load cell 70 to a shaft body 210 is formed in a plate shape. The fixing jig 220 is provided with a first mounting surface 221 which is mounted on the shaft body 210, and a second mounting surface 222 which is disposed on the side opposite to and parallel to the first mounting surface 221 and on which the load surface 73a of the load cell 70 is mounted.

Further, the shaft body 210 has mounting portions 211 provided at both upper and lower end portions. The mounting portion 211 has a support surface 211a orthogonal to the main load direction P. The support surface 211a is set back by an amount corresponding to the plate thickness of the fixing jig 220 with respect to the central axes L30 and L210 of the load wheel 30 and the shaft body 210. Further, the fixing jig 220 is fixed to the support surface 211a by fixing means such as a bolt in a state where the support surface 211a and the first mounting surface 221 are in contact with each other. In this way, the second mounting surface 222 of the fixing jig 220 fixed to the shaft body 210 is disposed as a plane which includes the central axes L30 and L210. Further, the load surface 73a of the load cell 70 is fixed to the second mounting surface 222 by fixing means such as a bolt in a state of being in contact with the second mounting surface 222. For this reason, the load cell 70 is disposed with the load surface 73a as a plane which is orthogonal to the main load direction P and includes the central axes L30 and L210. Further, in this embodiment, the load surface 73a is formed in a circular shape, and the central axes L30 and L210 pass through a center C73a, that is, the centroid, of the load surface 73a.

In the tire uniformity machine 200 of this embodiment, as described above, the load cell 70 is disposed such that the central axes L30 and L210 of the load wheel 30 and the shaft body 210 are included in the load surface 73a, and is connected to the shaft body 210, whereby generation of a moment can be suppressed even in forces in directions other than the main load direction P, that is, the force in the central axis direction Q and the force in the tangential direction R. For this reason, it is possible to minimize the mutual influence of the forces acting on the load cell 70 in the three directions due to the moments which are generated by the respective forces, and thus it is possible to more accurately measure the forces in the three directions and more accurately evaluate the RFV, the LFV, the TFV, or the rolling resistance of the tire T.

Further, in the embodiments described above, the load cell 70 has been described as an example in which the measurement center C70 is set inside the cell main body 71. However, there is no limitation thereto, and the measurement center may be set on the load surface 73a. In this manner, in a case where the measurement center is set on the load surface 73a, it is more preferable to dispose the load cell such that the central axes L30 and L210 are included in the load surface 73a of the load cell 70, as in this embodiment. Further, it is further preferable to dispose the load cell such that the central axes L30 and L210 pass through the measurement center on the load surface.

Figure 9:
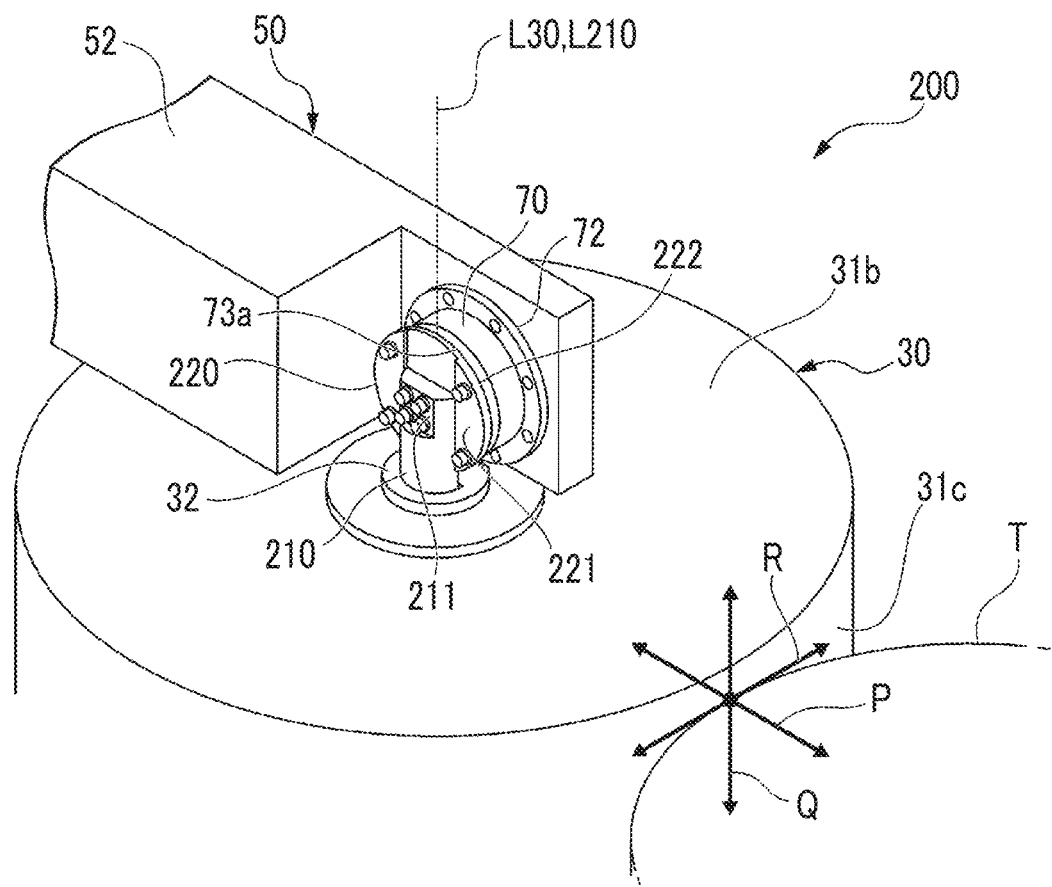
FIG. 9 is a perspective view showing details of a load cell portion of a tire uniformity machine according to a modification example of the second embodiment of the present invention.

Further, also in this embodiment, the load cell 70 is disposed such that the load surface 73a is orthogonal to the main load direction P. However, there is no limitation thereto. For example, as shown in FIG. 9, the load cell 70 may be disposed such that the load surface 73a is parallel to the main load direction P. In a case where the maximum load measurement direction of the load cell is a direction parallel to the load surface 73a, the maximum load measurement direction and the main load direction P can be made to coincide with each other, whereby it is more preferable.

The embodiments of the present invention have been described above in detail with reference to the drawings. However, the specific configurations are not limited to these embodiments, and design changes or the like within a scope which does not depart from the gist of the present invention are also included.

For example, as the load cell, a load cell is assumed in which three component forces orthogonal to each other are set to be measurable forces and a load larger than the component forces in other directions can be measured with the component force in one direction among the component forces being in the maximum load measurement direction. However, there is no limitation thereto. The maximum values of the measurable loads of the three component forces may be set to be the same. Furthermore, the load cell may be made so as to be able to measure six component forces including moments around three axes orthogonal to each other.

Further, in the tire uniformity machine of this embodiment, a configuration is made in which the load cell is connected to the shaft body mounted on the load wheel as a rotating body. However, there is no limitation thereto. A configuration may be adopted in which the load cell is disposed on the shaft body mounted on the tire and the rotation drive portion rotates the load wheel. Further, the central axes of the tire and the load wheel are set to be disposed in the up-down direction. However, there is no limitation thereto. For example, the central axes of the tire and the load wheel may be disposed in the horizontal direction. Further, the rotating body load measuring device is not limited to the tire uniformity machine, and if it is an object to measure forces in three directions; a main load direction, a central axis direction, and a tangential direction orthogonal to each other, while applying a main load to a columnar rotating body, the present invention can be applied thereto.

INDUSTRIAL APPLICABILITY

According to the rotating body load measuring device described above, the loads acting in.the main load direction which is one direction in the radial direction of the rotating body, and in which the main load acts, the central axis direction, and the tangential direction orthogonal to the main load direction and the central axis direction can be accurately measured with a compact device configuration.

REFERENCE SIGNS LIST

30: load wheel (rotating body)
60: shaft body

61: first mounting portion
70: load cell
73a: load surface
80: fixing jig
81: second mounting portion
83: mounting shaft
100, 200: tire uniformity machine (rotating body load measuring device)
C70: measurement center
L60, L210: central axis
P: main load direction

The invention claimed is:

1. A rotating body load measuring device comprising:
   a columnar load wheel rotatably supported by a shaft body of which an axis parallel to a central axis of a tire that is a test object, wherein the load wheel is capable of coming into contact with a peripheral surface of the tire;
   a rotation drive portion that rotationally drives either of the tire or the load wheel; and
   a load cell that is connected to the shaft body of the load wheel, has a planar load surface on which loads from the shaft body act, and that is configured to measure forces acting on the load surface as the loads,
   wherein the load cell is configured to measure the forces acting on the load surface in a state where a main load, that is acting on one direction in a radial direction, is applied to the load wheel,
   a centroid of the load surface is overlapped with a measurement center thereof,
   the load cell is configured to measure the forces in three directions; an X direction orthogonal to the load surface, and a Y direction and a Z direction orthogonal to the X direction and orthogonal to each other, via the load surface having the measurement center as a reference,
   the load cell is disposed such that the load surface is in a direction orthogonal to a direction of the main load, and the load cell is disposed such that the load surface and the central axis overlap when viewed in the main load direction, and is connected to the shaft body.

2. The rotating body load measuring device according to claim 1, wherein the load cell is disposed such that the centroid of the load surface and the central axis coincide with each other when viewed in the main load direction.

3. The rotating body load measuring device according to claim 1, wherein the load cell is disposed such that the central axis is included in the load surface.

4. The rotating body load measuring device according to claim 1, wherein the load cell has a maximum load measurement direction in which a measurable maximum load is the largest, among the three directions, and is disposed such that the main load direction and the maximum load measurement direction coincide with each other.

5. The rotating body load measuring device according to claim 1, further comprising:
   a fixing jig which is mounted on the shaft body so as to be rotatable around a mounting shaft orthogonal to the central axis, and to which the load cell is fixed.

6. The rotating body load measuring device according to claim 5, wherein one of the shaft body and the fixing jig includes a pair of first mounting portions disposed with the central axis interposed therebetween, and
   the other of the shaft body and the fixing jig includes a second mounting portion that is disposed in a plane that includes the central axis, between the pair of first mounting portions, and is mounted to the pair of first mounting portions to be rotatable around the mounting shaft.

7. The rotating body load measuring device according to claim 1,
   wherein the rotating body load measuring device measures non-uniformity of the tire, based on the forces measured in the load cell with the load wheel and a load acting from the tire as the main load.

* * * * *